Feb. 6, 1962 H. R. LESTER 3,019,864
LAGGING MOUNT
Filed Oct. 12, 1959
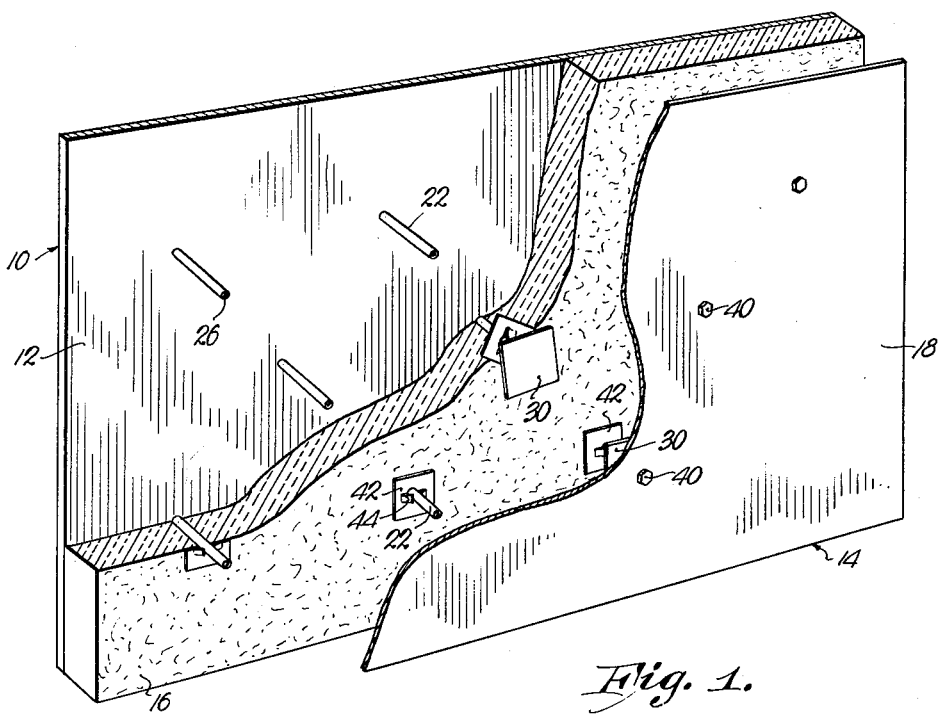
Fig. 1.
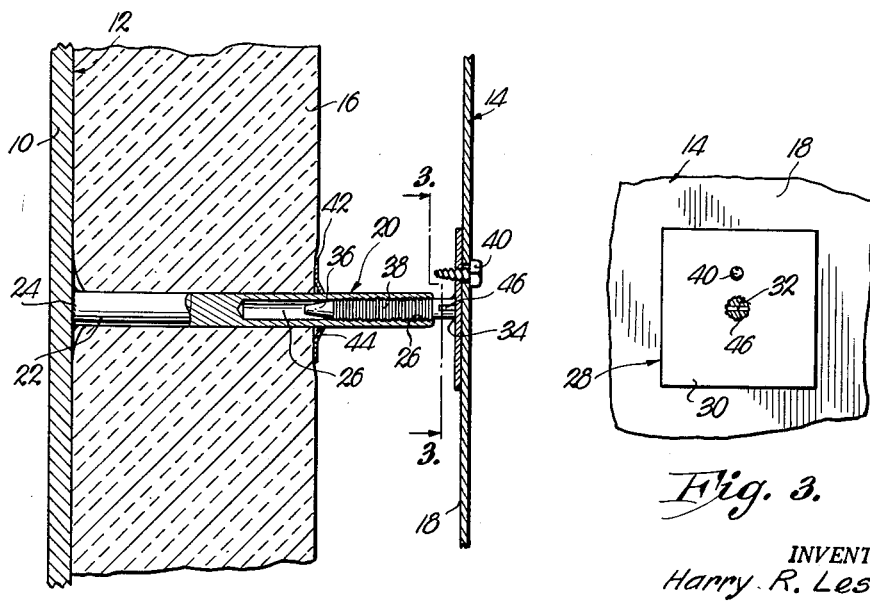
Fig. 2.
Fig. 3.
INVENTOR.
Harry R. Lester
BY
Hovey, Schmidt, Johnson & Hovey
ATTORNEYS.

United States Patent Office 3,019,864
Patented Feb. 6, 1962

3,019,864
LAGGING MOUNT
Harry R. Lester, Kansas City, Mo., assignor, by mesne assignments, to Tempmaster Corporation, Kansas City, Mo., a corporation of Missouri
Filed Oct. 12, 1959, Ser. No. 845,974
5 Claims. (Cl. 189—34)

This invention relates to the covering of walls such as steam boilers, fluid passages and conduits with lagging, including the usual insulation that is normally interposed between such wall and said lagging, the primary object being to provide a novel mount primarily for attaching the lagging to the wall but also for the purpose of holding the insulation in place.

Various means have heretofore been universally used for the attachment of lagging as well as insulation in the manner and for the purposes above described. Most common among the commercial types of attachment is the ordinary L-shaped bracket that is secured to the wall and over which the insulation must be impaled, but with a certain amount of difficulty. Thereupon, there follows a time-consuming task of holding the insulation in place against the wall by threading a maze of wires through openings in the brackets. Finally, the lagging is placed against the brackets and again there follows a time-consuming and somewhat difficult task of attaching the lagging to the brackets.

Other difficulties arising from such conventional mounts include inadequate support when the lagging is to be walked upon or to carry the weight of other structures, and the problems that are encountered by virtue of the fact that the insulation varies in thickness, oftentimes embedding the entire bracket and interfering with the attachment of the lagging thereto.

It is the most important object of the present invention to eliminate the aforementioned difficulties through the provision of a mount that not only makes it easy to impale the insulation thereon, but greatly facilitates the attachment of the lagging and provides adequate support for the lagging when it is necessary that it in turn support weight as in the case of its serving as a walking surface.

Another important object of the present invention is to provide a lagging mount that serves the additional purpose of holding the insulation in place without need for the time-consuming and unsatisfactory use of wire or the like laced over the insulation.

Still another object of the present invention is to provide a lagging mount that includes a pin and a fastener, the latter of which can be driven in place to such extent as conditions may require, i.e., depending upon the thickness of the insulation.

Still another object of the present invention is to provide a lagging mount that of itself, is capable of supporting a substantial amount of weight.

In the drawing:

FIG. 1 is a fragmentary, perspective view showing a laminated structure employing a plurality of lagging mounts made pursuant to my present invention, parts being broken away and in section to reveal details of construction.

FIG. 2 is an enlarged, fragmentary, detailed, cross-sectional view through the laminated structure illustrating the details of construction of one of the lagging mounts; and FIG. 3 is a fragmentary, detailed, cross-sectional view taken on irregular line 3—3 of FIG. 2.

As is well known by those skilled in this art, lagging and associated insulation, may be and is used in connection with a relatively large number of structures, including for example, steam boilers, conduits leading therefrom, and analogous structures. It is to be understood therefore, that the lagging mount of the instant invention is not to be considered limited insofar as use is concerned, and has use wherever one desires to cover a conduit, a pipe, a wall or the like for purposes of appearance, protection, insulation or other functions.

Hence, in the drawing there is shown a wall for illustrative purposes only, designated by the numeral 10 and which may, for example, be considered the jacket of a boiler or the wall which forms a part of a conduit carrying fluids or other materials, wall 10 having an outermost face 12 in the usual manner.

Similarly, the numeral 14 designates broadly any suitable lagging which, of course, in most instances, is in the form of metallic sheets, but here again, while the wall 12 and the lagging 14 are illustrated as taking the form of flat, parallel panels, the shape and configuration thereof will vary considerably and include many angles and bends, depending upon the application.

Insofar as the instant invention is concerned, the nature and characteristics of the insulation material 16 illustrated in the drawing, are of no consequence. Normally, such installation takes the form of bats or blankets and should be interposed between the face 12 of the wall 10 and the innermost surface 18 of the lagging 14. In fact, while there is illustrated but one layer of the insulation 16 in the drawing, it is not unusual to place the insulation 16 on the face 12 of the wall 10 in successive layers until a desired thickness is attained.

The subject matter of my present invention consists of a plurality of lagging mounts broadly designated by the numeral 20. Each lagging mount 20 includes a pin 22 rigidly mounted on face 12 of the wall 10 and extending outwardly therefrom. One means of providing the rigid connection of the pin 22 to the wall 10 is illustrated and takes the form of a weld 24 that may be continuous around the pin 22 at the base end thereof (see particularly FIG. 2). Each pin 22 is provided with a central, longitudinal bore 26 extending inwardly from the opposite end thereof.

Each mount 20 includes additionally a fastener broadly designated by the numeral 28, and each fastener 28 in turn consists of a flat plate 30, together with a rod 32 that is substantially shorter than the pin 22. Rod 32 is rigid to the plate 30 as by welding 34 and extends inwardly from the plate 30 as best seen in FIG. 2. Insertion of the rod 32 in the bore 26 of pin 22 is facilitated by virtue of a tapered end 36 on rod 32. A tight fit is provided between the rod 32 and the pin 22. More particularly, a plurality of ribs 38 on the rod 32 are press-fitted into frictional engagement with the wall of the pin 22 that forms the bore 26.

The plates 30 of the fasteners 28 bear flatly against the innermost surface 18 of the lagging 14 and are secured to the latter through use of one or more fastening means 40 for each plate 30 respectively. The fastening means 40 chosen for illustration, pass through both the lagging 14 and the plate 30 and are threaded in place after aligned holes are drilled through the lagging 14 and the plate 30, as illustrated in FIG. 2. In other words, the fastening means 40 may consist of ordinary metal screws or bolts that are conventionally forced into place after a starter hole is drilled into the metal forming the substance from which lagging 14 and plate 30 are made.

It can now be seen that after the plurality of pins 22 have been attached to the face 12 of wall 10, the insulation 16 can be easily and quickly impaled thereover and as each bat or panel of the first layer of the insulation 16 is placed against the face 12, it can be held in place through use of the pins 22 merely by placing a small metal clip 42 over each pin 22. Here again, clip 42 is substantially of conventional character in that it has opposed, resilient prongs 44 struck therefrom, such prongs readily yielding when the clip 42 is telescoped over the pin 22 and thereupon gripping or biting into the pin 22 to prevent outward movement of the clip 42 along the pin 22 away from the wall 10. Hence, as seen in FIG. 2, the clips 42 do in fact, hold the insulation 16 against the face 12 of wall 10.

Thereupon, if successive layers of the insulation 16 are to be placed on the pins 22 until a desired thickness is reached, each of such layers can again be held in place through use of additional clips 42.

The next operation is that of driving a desired number of rods 32 into corresponding bores 26. At this juncture, it is to be pointed out, that while a relatively large number of pins 22 is to be desired from the standpoint of holding the insulation 16 in place, it is not necessary that a fastener 28 be provided for every pin.

In any event, the plates 30 may be used to hammer the rods 32 in place and it is not necessary, nor particularly desirable, that all of the rods 32 be forced into the bores 26 until the plates 30 bear against the outermost ends of the pins 22. In fact, the spacing between the plates 30 and the pins 22 will vary, all for the purpose of aligning the plates 30 for subsequent attachment of the lagging 14 thereto.

It can now be seen also that the extent to which the rods 32 are driven into the pins 22 will vary in part upon the thickness of the insulation 16 which will in turn quite often vary throughout a large area. Oftentimes many of the pins 22 will not even protrude beyond the insulation 16, but the fact that certain of the pins 22 are completely embedded in the insulation 16 will not prevent the reception of such pins 22 of the corresponding rods 32.

Finally, after a predetermined number of fasteners 28 are in place, the lagging 14 may be placed against the outer faces of the plates 30 and attached thereto.

As a matter of convenience in locating the plates 30 after the lagging 14 has been placed thereagainst, magnetic means 46 is provided for each fastener 28 respectively. This may take the form of a small magnet that is embedded in the rod 32 prior to the attachment of the plate 30 thereto. Hence, through use of another magnet or other instrumentality on the outer face of the lagging 14, the workman can easily and quickly locate the plates 30 and determine where drilling should occur for reception of the fastening means 40.

The last step in the operation manifestly consists of applying the fastening means 40 and drawing the same tight to hold the lagging 14 tightly against the outer faces of the plates 30.

Having thus described the invention what is claimed as new and desired to be secured by Letters Patent is:

1. A laminated structure including a wall having an outermost face; lagging spaced from said face and provided with an opposed innermost face; a plurality of pins between the wall and the lagging; means rigidly connecting the extremity of each of the pins proximal to said wall, to the outermost face of the same with the pins extending outwardly therefrom, each of said pins being provided with an elongated, relatively smooth surfaced bore therein extending longitudinally of a respective pin from the extremity thereof proximal to said lagging; an elongated fastener removably telescoped into said bore of each of the pins, extending outwardly therefrom and having means on the outer face thereof normally frictionally engaging the surface of corresponding bores in the pins to prevent ready removal of the fasteners from said bores; a plate rigidly secured to the outer end of each of the fasteners and in engagement with that portion of the innermost face of the lagging in direct opposition to a respective plate; and means releasably connecting each of the plates to said lagging.

2. Laminated structure as set forth in claim 1 wherein said means for releasably connecting each of the plates to said lagging comprises at least one metal screw extending through the lagging and each plate respectively in spaced relationship to the fastener connected to a respective plate.

3. Laminated structure as set forth in claim 1 wherein said fasteners each have a series of outwardly projecting, longitudinally spaced, circumferentially extending ribs on the outer surface thereof, each of said ribs having an effective diameter slightly greater than the diameter of a respective bore prior to telescoping of each of the fasteners into respective bores whereby the ribs frictionally engage the inner bore defining surface of each of the pins.

4. Laminated structure as set forth in claim 1 wherein each of the fasteners is provided with magnetic means thereon adjacent said lagging for facilitating determination of the location of the plates from an accessible position on the outer face of said lagging.

5. Laminated structure as set forth in claim 1 wherein is provided insulation between the wall and the lagging and impaled over the pins, and a clip telescoped over each pin and holding the insulation against said face of the wall.

References Cited in the file of this patent

UNITED STATES PATENTS

| | | |
|---|---|---|
| 844,944 | Jacobs | Feb. 19, 1907 |
| 2,376,728 | Shaer | May 22, 1945 |
| 2,412,253 | Diggs | Dec. 10, 1946 |
| 2,590,687 | Crafton | Mar. 25, 1952 |
| 2,656,902 | Gotshall | Oct. 27, 1953 |

FOREIGN PATENTS

| | | |
|---|---|---|
| 90,349 | Norway | Nov. 11, 1957 |

OTHER REFERENCES

Nelson Stud Welding in Construction, Application Data Manual No. 1, Nelson Stud Welding-Division of Gregory Industries Inc., Lorain, Ohio, page 43. (Application 429.)